US012747829B2

(12) United States Patent
Furuzawa

(10) Patent No.: US 12,747,829 B2
(45) Date of Patent: Sep. 29, 2026

(54) PRESSURE VESSEL

(71) Applicant: TOYOTA JIDOSHA KABUSHIKI KAISHA, Toyota (JP)

(72) Inventor: Akiyoshi Furuzawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/072,143

(22) Filed: Mar. 6, 2025

(65) Prior Publication Data

US 2026/0049692 A1 Feb. 19, 2026

(30) Foreign Application Priority Data

Aug. 13, 2024 (JP) ................................ 2024-134890

(51) Int. Cl.
*F17C 1/16* (2006.01)

(52) U.S. Cl.
CPC ........ *F17C 1/16* (2013.01); *F17C 2201/0166* (2013.01); *F17C 2203/012* (2013.01); *F17C 2203/0604* (2013.01); *F17C 2203/0619* (2013.01); *F17C 2203/0673* (2013.01); *F17C 2205/0103* (2013.01); *F17C 2221/012* (2013.01); *F17C 2221/033* (2013.01); *F17C 2270/0105* (2013.01); *F17C 2270/0171* (2013.01); *F17C 2270/0173* (2013.01); *F17C 2270/0176* (2013.01); *F17C 2270/0178* (2013.01); *F17C 2270/0189* (2013.01)

(58) Field of Classification Search
CPC ................ F17C 1/16; F17C 2201/0166; F17C 2205/0103; F17C 2203/012; F17C 2203/0604
USPC .......................................................... 220/590
See application file for complete search history.

(56) References Cited

U.S. PATENT DOCUMENTS

| | | | | |
|---|---|---|---|---|
| 10,221,999 | B2 * | 3/2019 | Croteau | F17C 1/16 |
| 2009/0050635 | A1 * | 2/2009 | Richards | F17C 1/14 220/584 |
| 2019/0078733 | A1 * | 3/2019 | Chen | F17C 1/14 |

FOREIGN PATENT DOCUMENTS

| | | | | |
|---|---|---|---|---|
| EP | 3385597 B1 * | 3/2021 | | F17C 1/06 |
| EP | 3382258 B1 * | 1/2025 | | F17C 1/06 |
| JP | H10-513420 A | 12/1998 | | |
| WO | WO-9623721 A1 * | 8/1996 | | F17C 1/16 |
| WO | WO-2016057024 A1 * | 4/2016 | | F17C 1/16 |
| WO | WO-2017091224 A1 * | 6/2017 | | F17C 13/00 |

* cited by examiner

*Primary Examiner* — Rafael A Ortiz
(74) *Attorney, Agent, or Firm* — SoraIP, Inc.

(57) ABSTRACT

A pressure vessel containing compressed fluid includes: a plurality of tank cells, each of the tank cells extending along a first direction and disposed along a second direction perpendicular to the first direction, each of the tank cells containing compressed fluid; and a sheet-like fixation member wound around a periphery of the tank cells and configured to integrally bind the tank cells. A gap extending along the first direction is provided between two of the tank cells adjacent to each other and the fixation member. A reinforcement member is provided on an inner surface of the fixation member, the reinforcement member extending in the gap in the first direction and protruding toward the two adjacent tank cells. A surface of the reinforcement member is positioned away from each of surfaces of the two adjacent tank cells.

4 Claims, 5 Drawing Sheets

PRESSURE VESSEL

CROSS-REFERENCE TO RELATED APPLICATION

This application claims priority to Japanese Patent Application No. 2024-134890 filed on Aug. 13, 2024. The disclosure of the above-identified application, including the specification, drawings, and claims, is incorporated by reference herein in its entirety.

BACKGROUND

1. Technical Field

A technology disclosed in the present specification relates to a pressure vessel, and in particular, relates to a pressure vessel that contains compressed fluid.

2. Description of Related Art

Japanese Unexamined Patent Application Publication (Translation of PCT Application) No. 10-513420 (JP 10-513420 A) discloses a pressure vessel. The pressure vessel includes a plurality of tank cells each of which contains compressed fluid, and a sheet-like fixation member that integrally binds the tank cells. Each of the tank cells extends along a first direction and is disposed along a second direction perpendicular to the first direction, and the sheet-like fixation member is wound around a periphery of the tank cells. A gap extending along the first direction is formed between two of the tank cells adjacent to each other and the fixation member, and a reinforcement member is provided in the gap. Each gap between the tank cells and the fixation member is substantially filled with the reinforcement member, and thereby, the pressure vessel has relatively high rigidity.

SUMMARY

Each of the tank cells expands and contracts depending on its inner pressure. There is concern that, when the gap between the tank cells and the fixation member is substantially filled with the reinforcement member, the reinforcement member disturbs expansion of the tank cells.

In view of the aforementioned circumstances, the present specification provides a technology for improving rigidity of a pressure vessel while allowing expansion of tank cells.

A technology disclosed in the present specification is embodied as a pressure vessel that contains compressed fluid. As to a first aspect, the pressure vessel includes: a plurality of tank cells, each of the tank cells extending along a first direction and disposed along a second direction perpendicular to the first direction, each of the tank cells containing compressed fluid; and a sheet-like fixation member wound around a periphery of the tank cells and configured to integrally bind the tank cells. A gap extending along the first direction is provided between two of the tank cells adjacent to each other and the fixation member. A reinforcement member is provided on an inner surface of the fixation member, the reinforcement member extending in the gap in the first direction and protruding toward the two adjacent tank cells. A surface of the reinforcement member is positioned away from each of surfaces of the two adjacent tank cells.

In the pressure vessel above, the reinforcement member is provided on the inner surface of the fixation member. The reinforcement member extends in the first direction, and protrudes inward toward the tank cells. Thereby, rigidity of the pressure vessel can be improved. Since the reinforcement member is provided in the gap existing between the two adjacent tank cells and the fixation member, a size of the pressure vessel does not increase. In addition, the surface of the reinforcement member is positioned away from the surfaces of the two adjacent tank cells. Therefore, even when the tank cell expands, the surface of the tank cell does not immediately come into contact with the surface of the reinforcement member. Namely, expansion of the tank cell is allowed. Note that, when the tank cell excessively expands, the surface of the tank cell occasionally comes into contact with the surface of the reinforcement member. Thereby, the reinforcement member can restrain the tank cell from excessively expanding.

As to a second aspect, in the first aspect, each of the tank cells may include a pair of plate members provided at both end portions in the first direction, and a band member spanned between the plate members. According to such a configuration, a dimension of each of the tank cells in the first direction can be restrained. In addition, at least part of the band member may extend inside the reinforcement member. According to such a configuration, the band member can also be used as a part of the reinforcement member.

As to a third aspect, in the first or second aspect, the tank cells may include two end tank cells, and an inner tank cell disposed between the two end tank cells. In this case, a dimension of the inner tank cell in the second direction may be 0.4 times to 0.6 times a dimension of the inner tank cell in a third direction perpendicular to the first direction and the second direction. According to such a configuration, a ratio (what is called mass efficiency) of a mass of stored compressed fluid relative to a mass of the inner tank cell can be enhanced.

As to a fourth aspect, in any one of the first to third aspects, connectors of the two adjacent tank cells may be offset in opposite directions from each other in a third direction perpendicular to the first direction and the second direction. According to such a configuration, as to the two adjacent tank cells, a distance between the connectors can be made large. Thereby, work of connecting various piping components to the connectors of the tank cells can be easily performed.

As to a fifth aspect, in any one of the first to fourth aspects, the fixation member and the reinforcement member may be composed of carbon fiber reinforced plastics. According to such a configuration, rigidity of the pressure vessel can be further improved. As an example, the reinforcement member may be integrally formed with the fixation member. According to such a configuration, the sheet-like fixation member can be effectively restrained from vibrating.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A pressure vessel 10 of an embodiment will be described with reference to the drawings. The pressure vessel 10 contains compressed fluid. The pressure vessel 10 in the present embodiment contains compressed hydrogen gas as the compressed fluid. For example, the pressure vessel 10 is mounted on a vehicle with hydrogen being as a motive power source, such as a fuel cell electric vehicle (for example, an automobile, a bus, a truck, or a train) or a hydrogen engine vehicle. Notably, the pressure vessel 10 may be mounted on various movable bodies, other than vehicles, (for example, a ship and an airplane). Notably, other than the compressed hydrogen gas, the compressed fluid may be other compresses gas such as compressed natural gas, or compressed liquid.

Figure 1:
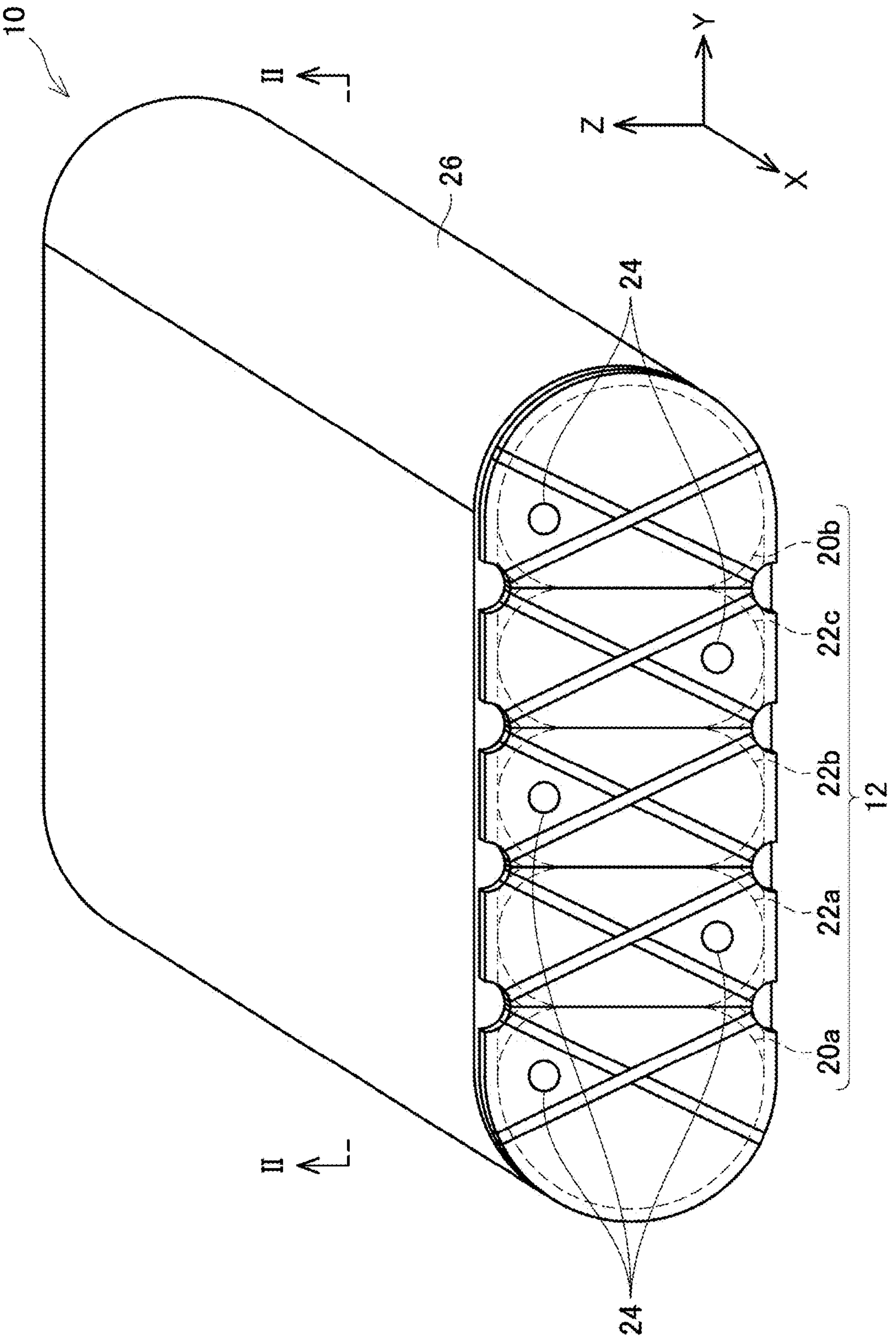
FIG. 1 is a view schematically showing a configuration of a pressure vessel 10 of an embodiment.
Figure 2:
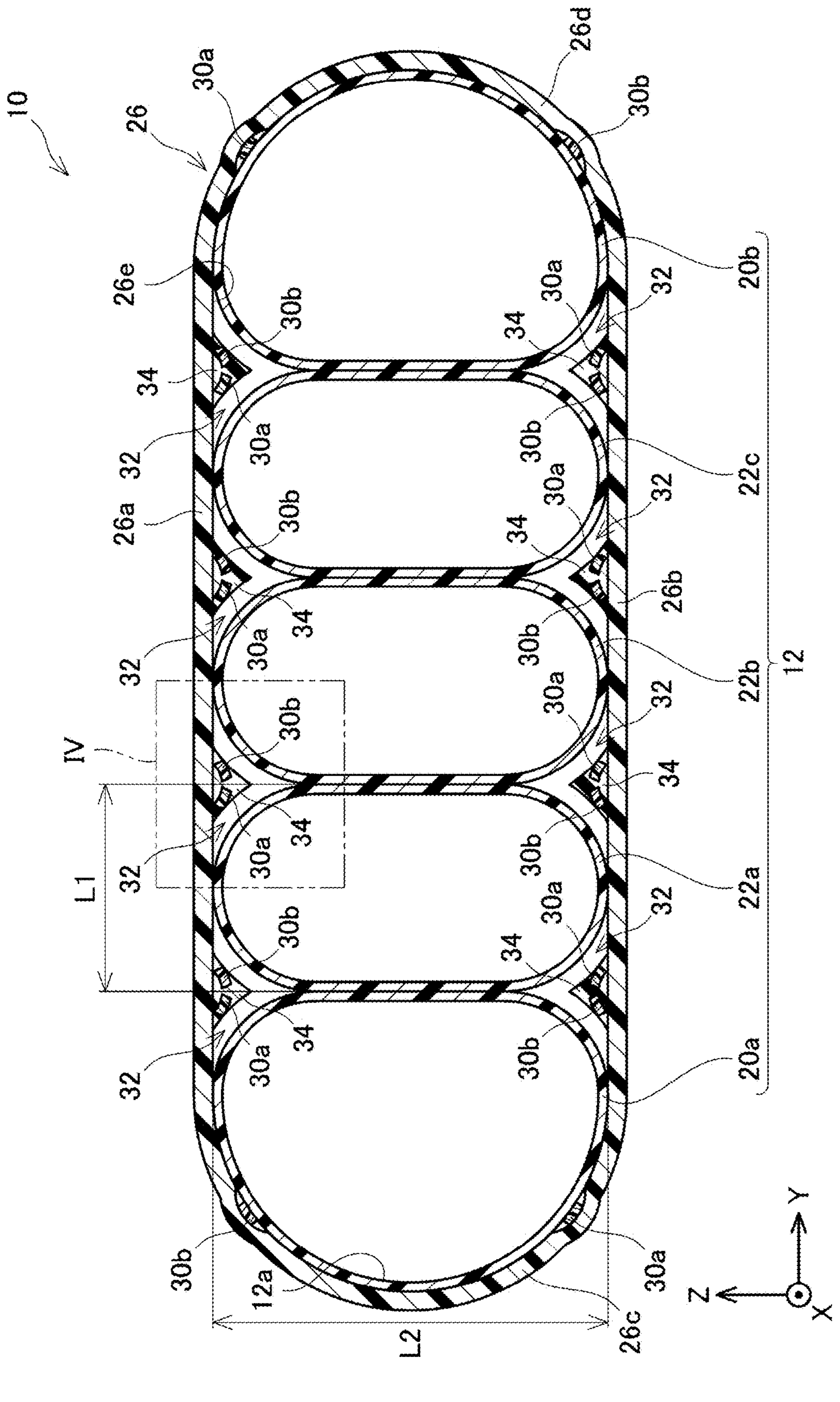
FIG. 2 is a sectional view taken along the II-II line in FIG. 1.
Figure 3:
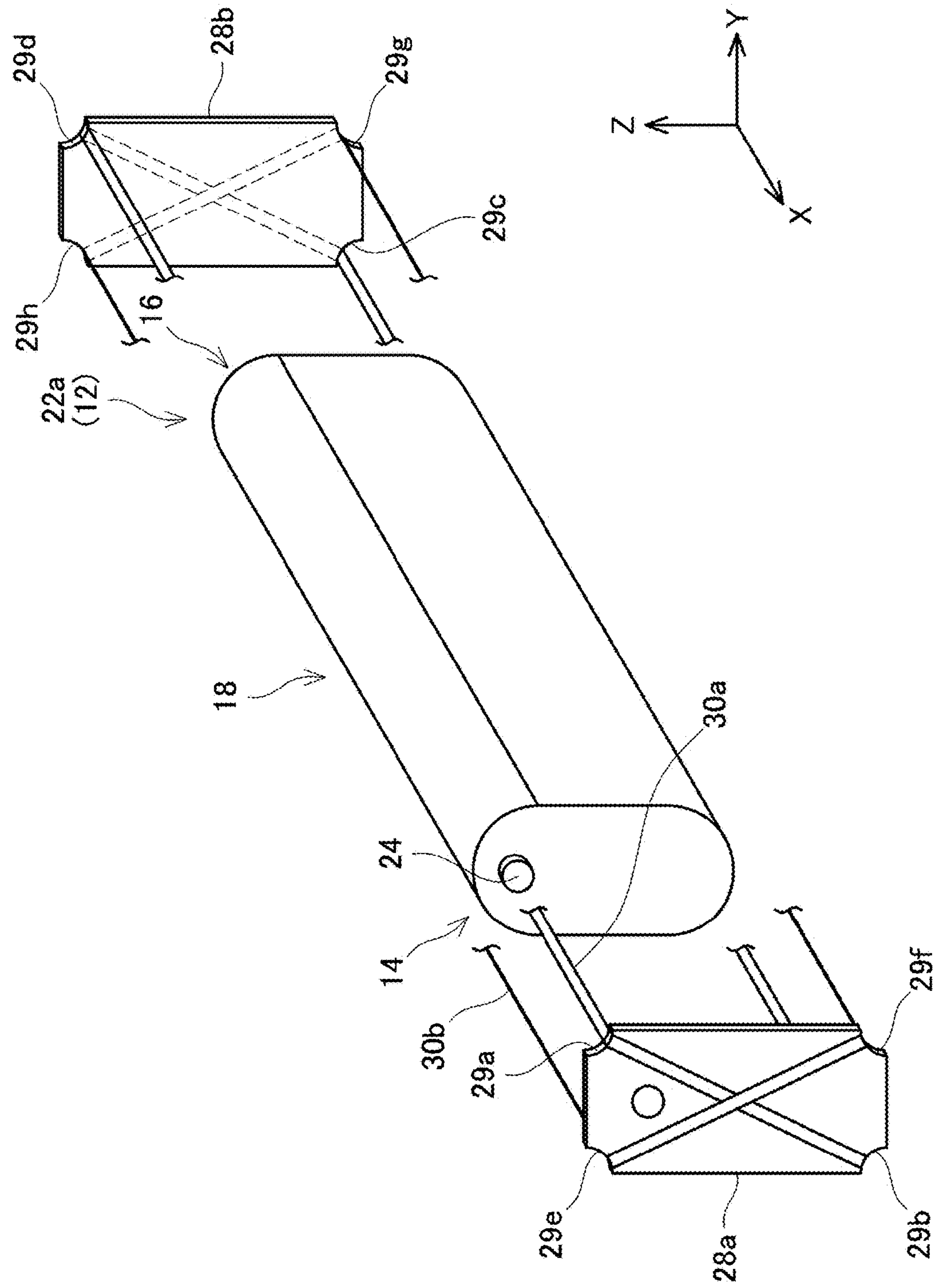
FIG. 3 is a view for explaining a configuration of a tank cell 12.

As shown in FIGS. 1 to 3, the pressure vessel 10 includes a plurality of tank cells 12. Each of the tank cells 12 contains the compressed hydrogen gas. In the present embodiment, a gas impermeable liner is disposed on an inner side 12*a* of each of the tank cells 12. Each of the tank cells 12 includes a first end portion 14, a second end portion 16, and an intermediate portion 18. Both the first end portion 14 and the second end portion 16 have dome shapes. The first end portion 14 is provided on one side (+X-axis direction) in a first direction, and the second end portion 16 is provided on another side (−X-axis direction) in the first direction. The intermediate portion 18 is provided between the first end portion 14 and the second end portion 16, and has a cylindrical shape extending along the first direction (X-axis direction). Namely, each of the tank cells 12 extends along the first direction. Moreover, the tank cells 12 are arranged along a second direction (Y-axis direction) perpendicular to the first direction. For example, the tank cells 12 are composed of carbon fiber reinforced plastics (CFRP) which is a composite material of a thermosetting resin and carbon fibers. For example, the liner is composed of a metal film, a resin film, and/or the like.

As shown in FIGS. 1 and 2, the tank cells 12 include two end tank cells 20*a*, 20*b* and a plurality of inner tank cells 22*a*, 22*b*, 22*c*. The two end tank cells 20*a*, 20*b* include a first end tank cell 20*a* and a second end tank cell 20*b*. The inner tank cells 22*a*, 22*b*, 22*c* include a first inner tank cell 22*a*, a second inner tank cell 22*b*, and a third inner tank cell 22*c*. The first end tank cell 20*a* is adjacent to the first inner tank cell 22*a*, the first inner tank cell 22*a* is adjacent to the second inner tank cell 22*b*, the second inner tank cell 22*b* is adjacent to the third inner tank cell 22*c*, and the third inner tank cell 22*c* is adjacent to the second end tank cell 20*b*. Namely, the first end tank cell 20*a*, the first inner tank cell 22*a*, the second inner tank cell 22*b*, the third inner tank cell 22*c*, and the second end tank cell 20*b* are sequentially arranged from one side (−Y-axis direction) toward another side (+Y-axis direction) in the second direction.

As shown in FIGS. 1 and 3, each of the tank cells 12 includes a connector 24. The connector 24 is provided at an end portion of each of the tank cells 12 on the one side (+X-axis direction) in the first direction. The connector 24 is configured such that a valve (not shown) can be attached thereto and detached therefrom. By the valve being connected to the connector 24, the tank cell 12 is connected to a hydrogen gas feed pipe (not shown), and hydrogen gas can be fed to the hydrogen gas feed pipe from an inner space of the tank cell 12. In the present embodiment, the connector 24 of the first end tank cell 20*a*, the connector 24 of the second inner tank cell 22*b*, and the connector 24 of the second end tank cell 20*b* are on one side (+Z-axis direction) in a third direction perpendicular to the first direction and the second direction, and the connector 24 of the first inner tank cell 22*a* and the connector 24 of the third inner tank cell 22*c* are disposed on another side (−Z-axis direction) in the third direction. As above, the connectors 24 of two of the tank cells 12 adjacent to each other are offset in opposite directions from each other in the third direction (Z-axis direction) perpendicular to the first direction and the second direction.

Figure 4:
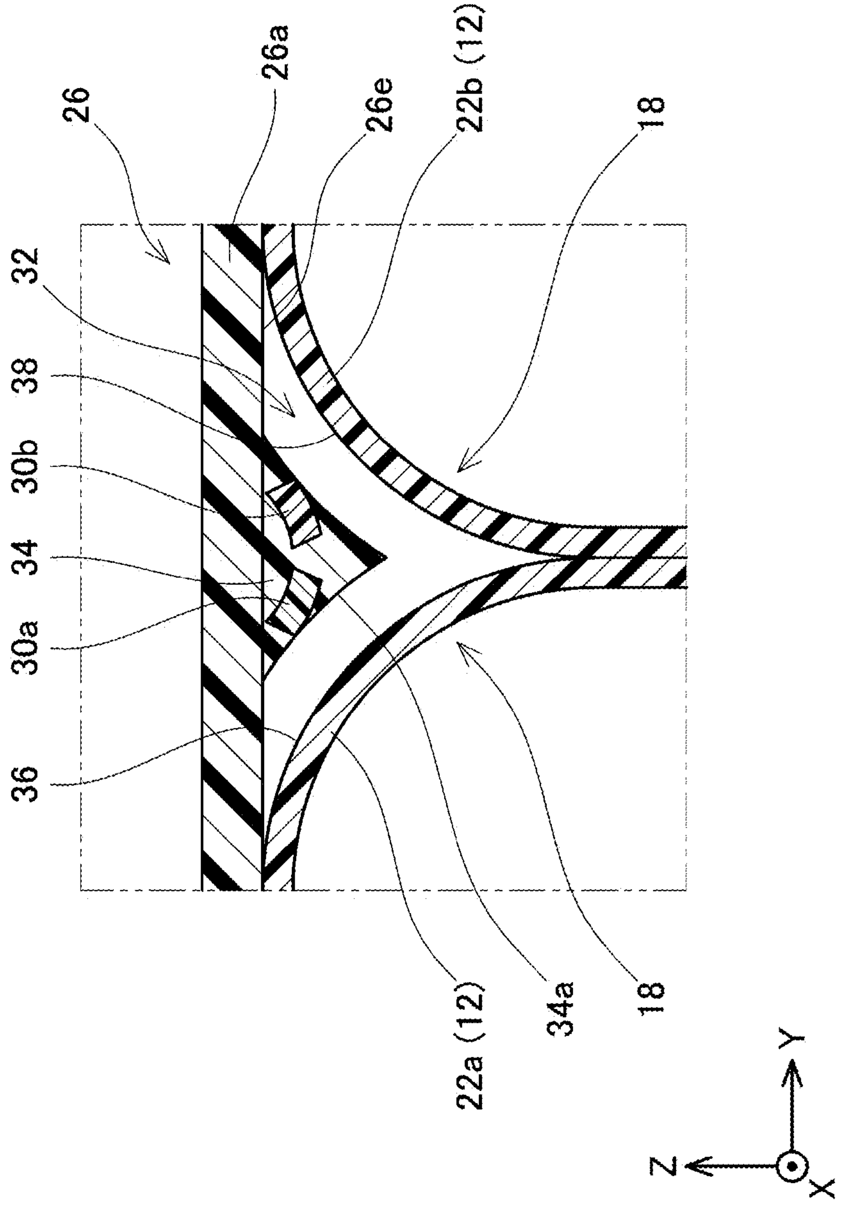
FIG. 4 is an expanded view of the IV portion in FIG. 2.

As shown in FIGS. 1, 2, and 4, the pressure vessel 10 further includes a fixation member 26. The fixation member 26 is a sheet-like member. The fixation member 26 is wound around a periphery of the tank cells 12. Thereby, the fixation member 26 integrally binds the tank cells 12. For example, the fixation member 26 is composed of CFRP. A shape of the fixation member 26 is defined depending on arrangement of the tank cells 12. As an example, the tank cells 12 in the present embodiment are arranged in a row along the second direction (Y-axis direction). Therefore, the fixation member 26 includes a first flat surface portion 26*a*, a second flat surface portion 26*b*, and two curved portions 26*c*, 26*d*. The first flat surface portion 26*a* is positioned on one side (+Z-axis direction) in the third direction relative to the tank cells 12. The second flat surface portion 26*b* is positioned on another side (−Z-axis direction) in the third direction relative to the tank cells 12. The first flat surface portion 26*a* and the second flat surface portion 26*b* face each other via the tank cells 12, and spread along flat planes perpendicular to the third direction (Z-axis direction). The two curved portions 26*c*, 26*d* are positioned at both ends in the second direction (Y-axis direction) relative to the tank cells 12, and extend between the first flat surface portion 26*a* and the second flat surface portion 26*b*.

As shown in FIGS. 2 and 3, a pair of plate members 28*a*, 28*b* and a pair of band members 30*a*, 30*b* are provided on each of the tank cells 12. The plate members 28*a*, 28*b* include a first plate member 28*a* and a second plate member 28*b*. The first plate member 28*a* is provided at an end portion on one side (+X-axis direction) in the first direction. The second plate member 28*b* is provided at an end portion on another side (−X-axis direction) in the first direction. As above, the plate members 28*a*, 28*b* are provided at both end portions in the first direction. The band members 30*a*, 30*b* include a first band member 30*a* and a second band member 30*b*. The first band member 30*a* is spanned between two facing positions 29*a*, 29*b* of the first plate member 28*a* and two facing positions 29*c*, 29*d* of the second plate member 28*b*. The second band member 30*b* is spanned between two other facing positions 29*e*, 29*f* of the first plate member 28*a* and two other facing positions 29*g*, 29*h* of the second plate member 28*b*. As above, the band members 30*a*, 30*b* are spanned between the plate members 28*a*, 28*b* at different positions. For example, the plate members 28*a*, 28*b* are composed of metal. For example, the band members 30*a*, 30*b* are composed of CFRP. Notably, the pair of band member 30*a*, 30*b* is not necessarily needed, and at least one band member may be employed.

As shown in FIG. 2, a plurality of gaps 32 exists between the tank cells 12 and the fixation member 26. Each of the gaps 32 is formed between the two adjacent tank cells 12 and the fixation member 26. For example, one of the gaps 32 is formed among the first end tank cell 20*a*, the adjacent first inner tank cell 22*a*, and the first flat surface portion 26*a* of the fixation member 26. Moreover, another of the gaps 32 is formed among the second inner tank cell 22*b*, the adjacent third inner tank cell 22*c*, and the second flat surface portion 26*b* of the fixation member 26. Since in the present embodiment, the five tank cells 12 are arranged in a row, there are totally eight gaps 32. Each of the gaps 32 has a substantially triangular section, and extends along the first direction (X-axis direction).

As shown in FIGS. 2 and 4, the pressure vessel 10 further includes a plurality of reinforcement members 34. The reinforcement members 34 are positioned in the respective gaps 32, and are provided on an inner surface 26*e* of the fixation member 26. Each of the reinforcement members 34 extends in the first direction (X-axis direction), and protrudes toward the two adjacent tank cells 12. A surface 34*a* of the reinforcement member 34 is positioned away from surfaces 36, 38 of the two adjacent tank cells 12. Not being specially limited, the reinforcement member 34 may be composed of an equivalent material to that of the fixation member 26. The reinforcement member 34 in the present embodiment is composed of CFRP similarly to the fixation member 26.

In the pressure vessel 10 above, the reinforcement member 34 is provided on the inner surface 26*e* of the fixation member 26. The reinforcement member 34 extends in the first direction (X-axis direction), and protrudes inward toward the tank cells 12. Thereby, rigidity of the pressure vessel 10 can be improved. Since the reinforcement member 34 is provided in the gap 32 existing between the two adjacent tank cells 12 and the fixation member 26, a size of the pressure vessel 10 does not increase. In addition, the surface 34*a* of the reinforcement member 34 is positioned away from the surfaces 36, 38 of the two adjacent tank cells 12. Therefore, even when the tank cell 12 expands, the surface 36, 38 of the tank cell 12 does not immediately come into contact with the surface 34*a* of the reinforcement member 34. Namely, expansion of the tank cell 12 is allowed. Note that, when the tank cell 12 excessively expands, the surface 36, 38 of the tank cell 12 occasionally comes into contact with the surface 34*a* of the reinforcement member 34. Thereby, the reinforcement member 34 can restrain the tank cell 12 from excessively expanding.

In the aforementioned embodiment, as shown in FIGS. 1 and 3, on each of the tank cells 12, the plate members 28*a*, 28*b* provided at both end portions in the first direction and the band members 30*a*, 30*b* spanned between the plate members 28*a*, 28*b* are provided. According to such a configuration, a dimension of the tank cell 12 in the first direction (X-axis direction) can be restrained.

In this case, as an example, as shown in FIG. 4, a part of the band member 30*a*, 30*b* extends inside the reinforcement member 34. According to such a configuration, the band member 30*a*, 30*b* can also be used as a part of the reinforcement member 34. Note that the band member 30*a*, 30*b* does not necessarily extend inside the reinforcement member 34.

In the aforementioned embodiment, as shown in FIGS. 1 and 3, the connectors 24 of the two adjacent tank cells 12 are offset in opposite directions from each other in the third direction (Z-axis direction) perpendicular to the first direction and the second direction. According to such a configuration, as to the two adjacent tank cells 12, a distance between the connectors 24 can be made large. Thereby, work of connecting various piping components to the connectors 24 of the tank cells 12 can be easily performed.

In the aforementioned embodiment, the fixation member 26 and the reinforcement members 34 are composed of CFRP. According to such a configuration, rigidity of the pressure vessel 10 can be further improved. In addition, in the present embodiment, the reinforcement members 34 are integrally formed with the fixation member 26. According to such a configuration, the sheet-like fixation member 26 can be effectively restrained from vibrating. Note that the reinforcement members 34 may not be composed of an equivalent material to that of the fixation member 26. Moreover, the reinforcement members 34 are not necessarily integrated with the fixation member 26.

In the aforementioned embodiment, the tank cells 12 include the two end tank cells 20*a*, 20*b* and the inner tank cells 22*a*, 22*b*, 22*c* disposed between the two end tank cells 20*a*, 20*b*. In this case, as an example, as shown in FIG. 2, a dimension L1 of the inner tank cells 22*a*, 22*b*, 22*c* in the second direction (Y-axis direction) is 0.5 times a dimension L2 of the inner tank cell 22*a*, 22*b*, 22*c* in the third direction (Z-axis direction) perpendicular to the first direction and the second direction. According to such a configuration, a ratio (what is called mass efficiency) of a mass of stored compressed fluid relative to a mass of the inner tank cells 22*a*, 22*b*, 22*c* can be enhanced. Notably, in view of the mass efficiency, the dimension L1 of the inner tank cells 22*a*, 22*b*, 22*c* in the second direction (Y-axis direction) may be 0.4 times to 0.6 times the dimension L2 of the inner tank cells 22*a*, 22*b*, 22*c* in the third direction (Z-axis direction) perpendicular to the first direction and the second direction.

In the aforementioned embodiment, the number of the inner tank cells 22*a*, 22*b*, 22*c* is three. Nonetheless, the number of the inner tank cells 22*a*, 22*b*, 22*c* is not necessarily three. For example, in another embodiment, one inner tank cell may be employed. Otherwise, in another embodiment, the number of inner tank cells may be zero.

Figure 5:
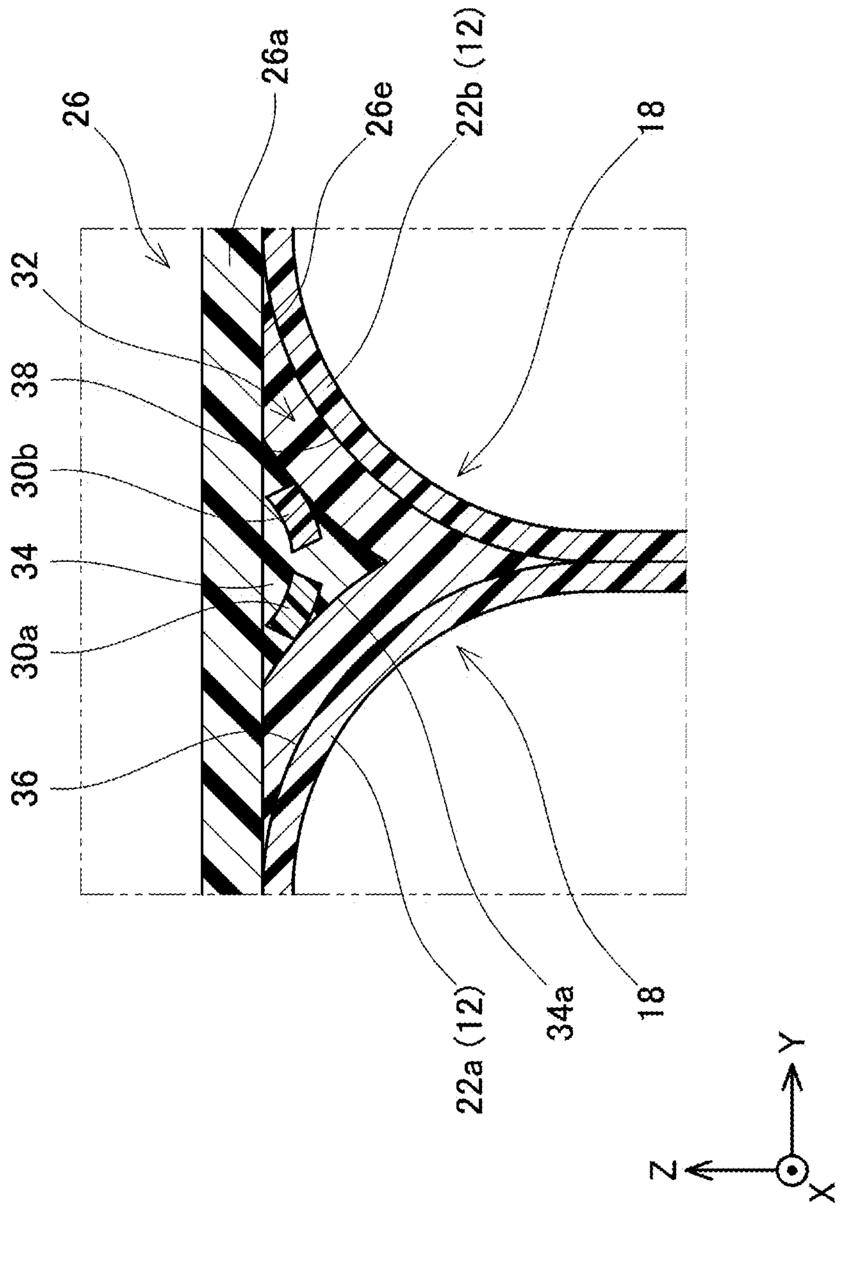
FIG. 5 is an expanded view, of a modification, corresponding to FIG. 4.

In the aforementioned embodiment, the surface 34*a* of the reinforcement member 34 is positioned away from the surfaces 36, 38 of the two adjacent tank cells 12, and a gap (that is, an air space) exists between the reinforcement member 34 and the two adjacent tank cells 12. Note that, as shown in FIG. 5, in another embodiment, the gap may be filled with a soft material such as sponge. According to such a configuration, by the soft material such as sponge contracting when the tank cell(s) 12 expand, the expansion of the tank cell(s) 12 can be allowed.

While some specific embodiments have been described in detail, these are merely exemplary illustrations and do not limit the claims. A technology as disclosed in the claims includes various modifications and alterations of the specific embodiments illustrated above. As to the technical elements described with the present specification or the drawings, each of those solely or a combination of some or all of those exhibits technical usefulness.

What is claimed is:

1. A pressure vessel configured to contain compressed fluid, the pressure vessel comprising:
- a plurality of tank cells, each of the tank cells extending along a first direction and disposed along a second direction perpendicular to the first direction, each of the tank cells being configured to contain compressed fluid; and
- a fixation member wound around a periphery of the tank cells and configured to integrally bind the tank cells, the fixation member being a sheet, wherein:
- a gap extending along the first direction is provided between two of the tank cells adjacent to each other and the fixation member;
- a reinforcement member is provided on an inner surface of the fixation member, the reinforcement member extending in the gap in the first direction and protruding toward the two adjacent tank cells;

a surface of the reinforcement member is positioned away from each of surfaces of the two adjacent tank cells;

each of the tank cells includes a pair of plate members provided at both end portions in the first direction, and a band member spanned between the plate members; and at least part of the band member extends inside the reinforcement member.

2. The pressure vessel according to claim 1, wherein:

the tank cells include two end tank cells, and an inner tank cell disposed between the two end tank cells; and a dimension of the inner tank cell in the second direction is 0.4 times to 0.6 times a dimension of the inner tank cell in a third direction perpendicular to the first direction and the second direction.

3. The pressure vessel according to claim 1, wherein:

each of the tank cells includes a connector at one end portion in the first direction; and the connectors of the two adjacent tank cells are offset in opposite directions from each other in a third direction perpendicular to the first direction and the second direction.

4. The pressure vessel according to claim 1, wherein the fixation member and the reinforcement member are composed of carbon fiber reinforced plastics.

* * * * *